United States Patent [19]

Pache et al.

[11] 4,436,980
[45] Mar. 13, 1984

[54] ELECTRIC ARC WELDING APPARATUS

[75] Inventors: Norbert Pache, Augsburg; Karel Mazac, Friedberg, both of Fed. Rep. of Germany

[73] Assignee: Industrie-Werke Karlsruhe Augsburg Aktiengesellschaft, Augsburg, Fed. Rep. of Germany

[21] Appl. No.: 262,906

[22] Filed: May 12, 1981

[30] Foreign Application Priority Data

May 13, 1980 [DE] Fed. Rep. of Germany ....... 3018199

[51] Int. Cl.³ .............................................. B23K 9/08
[52] U.S. Cl. ...................................... 219/123; 336/60
[58] Field of Search ........................... 219/123; 336/60

[56] References Cited

U.S. PATENT DOCUMENTS

| | | | |
|---|---|---|---|
| 1,307,654 | 6/1919 | Bergonie | 336/60 X |
| 1,529,570 | 3/1925 | Bethke | 336/60 X |
| 2,931,889 | 4/1960 | Lingafelter | |
| 4,027,135 | 5/1977 | Barger | 219/123 X |
| 4,186,364 | 1/1980 | Hanaoka | 335/284 |
| 4,222,021 | 9/1980 | Bunker, Jr. | |
| 4,308,446 | 12/1981 | Okane | 219/123 |

FOREIGN PATENT DOCUMENTS

| | | | |
|---|---|---|---|
| 2339818 | 3/1974 | Fed. Rep. of Germany | |
| 2321070 | 12/1974 | Fed. Rep. of Germany | |
| 2815751 | 10/1979 | Fed. Rep. of Germany | 219/123 |
| 52-38199 | 3/1977 | Japan | 335/284 |
| 1045149 | 10/1966 | United Kingdom | 219/123 |
| 2015570 | 4/1970 | United Kingdom | 219/123 |

Primary Examiner—B. A. Reynolds
Assistant Examiner—Catherine Sigda
Attorney, Agent, or Firm—Karl F. Ross; Herbert Dubno

[57] ABSTRACT

An electrical arc welding device for two workpieces to be welded together along an annular weld seam, e.g. ends of pipe sections, and in which a magnet arrangement surrounds the welding-seam path. According to the invention, a magnetizable ring is formed by the inwardly extending poles of a plurality of magnets having flat cores and surrounded by coils for electromagnetically energizing the cores.

10 Claims, 6 Drawing Figures

ELECTRIC ARC WELDING APPARATUS

FIELD OF THE INVENTION

The present invention relates to an apparatus for electrical arc welding and, more particularly, to an apparatus for producing an annular weld seam for joining two annular workpieces together. More particularly, the invention relates to a magnetic arrangement for such electric arc welding.

BACKGROUND OF THE INVENTION

From German Pat. No. 23 21 070, for example, it is known to provide an apparatus for the electric arc welding of two workpieces of fusible metal, preferably pipe ends, rings or the like, along a closed weld path, for example a circular, elliptical, polygonal or other annular weld seam, with the aid of at least two unipolar magnets lying in the welding plane and disposed generally radially to magnetize a continuous ring encircling the weld-seam path. The distribution of the magnets and their connection is such as to homogenize the magnetic field and the ring can be radially separable.

The electric arc welding of annular bodies along an endless weld seam in the aforementioned manner is effected by bringing together the two workpieces so that their junction lies in the plane of the magnets and an arc can be struck between the workpieces which are connected to an appropriate electric current source, the welding arc migrating under the influence of the magnetic field around the weld-seam path to form the endless weld seam.

While the system described in this publication is highly effective and represents a substantial improvement over earlier arrangements because of its lower structural height and relatively high magnetic field concentration at the weld site, the maximum field strength which can be generated is nevertheless limited.

OBJECTS OF THE INVENTION

It is the principal object of the present invention to provide a magnetic arc welding device for the purposes described which, by comparison with the system described in the aforementioned publication, utilizing radially oriented magnets, gives still greater magnetic field concentrations for the same or smaller height of the structure.

Another object of the invention is to provide a device for the electric arc welding of annular workpieces along a closed weld-seam path which can yield the same or greater magnetic field concentrations at lower cost, for example, with respect to the amplitude of the current for energizing the coils, with respect to the number of turns of the coils, and with respect to the overall mass and complexity of the structure.

Yet another object of the invention is to provide a device for the purposes described which will allow the magnetic coils to be set at greater distances from the weld site, thereby avoiding spatter from the weld seam and other disadvantages which might arise when the arc welding operation is carried out.

In general, therefore, it is an object of the invention to provide an improved magnetic device for electric arc welding.

SUMMARY OF THE INVENTION

These objects and others which will become more readily apparent hereinafter are attained, in accordance with the invention, in an apparatus which comprises a magnetic assembly whose poles in a gapless or approximately gapless manner meet around the weld site to form a substantially closed inner surface of a ring completely surrounding the weld site and hence the junction between the workpieces at which the endless welding path is to be provided.

With this system, it is possible not only to obtain all of the advantages mentioned above but also to cool the magnets more effectively so that even with high ampere turns, the system can operate effectively.

According to the invention, therefore, the device comprises a plurality of generally flat magnets, each of which is formed by a magnetic pole piece which is likewise flattened and lies in the plane of the weld seam, the pole piece having an end turned toward the weld site and an end turned away from the latter, the end turned away from the weld site carrying a flattened magnet coil.

According to this invention, the ends of the magnets lie in direct contact, are continuous with one another or are practically juxtaposed in a gapless manner to form a closed inner surface of a ring surrounding the workpieces to be welded together and closely juxtaposed therewith.

This arrangement, in which the ends forming the ring are unitary with the pole piece portions upon which the coils are wound, eliminates magnetic bridging resistances which characterize the junction between the rings and the magnets of the earlier system. Furthermore, the system of the invention is especially compact, requires little space, and enables the entire magnet assembly to be readily cooled.

According to a very simple embodiment of the invention, two magnets with oppositely extending cores are provided whose juxtaposed ends turned toward the welding site are semicylindrical and each define half of the aforementioned ring inner surface. Naturally, an especially space-saving low height construction of the device is achieved when each of these magnetic cores is a flat or platelike body of magnetic material.

According to another feature of the invention, the magnetic cores are provided internally with passages through which a coolant, e.g. water, can be passed or circulated. Hitherto, a space-saving arrangement required indirect cooling of the ring by contact with a cooling body traversed by the coolant. The system of the present invention thus permits direct cooling not only of the magnetic cores but also of the ring.

When the magnetic cores are flat bodies, the cooling passages in the core can extend in straight line patterns and can lie perpendicularly to one another so that fabrication of the cores with the cooling passages is relatively simple.

It has also been found that it is possible to fabricate a magnetic structure according to the invention at especially low cost and in a simple manner when the two magnets are formed by a single magnetic bar provided centrally with a bore through which the workpieces are passed.

The bar thus has ends constituting arms which form the magnetic cores and carry respective coils.

In a two-pole arrangement of this type, the magnetic cores lie opposite one another. It is also possible, in accordance with this invention, to use a star-shaped flat plate formed with a central bore and each arm carrying a respective coil.

In order to enable the two pipes, for example, to be introduced easily into the device, there may be provided, in accordance with the invention, that the two or more magnets, whose proximal ends form the closed inner ring surface, are relatively movable, e.g. swingable by hinges, articulations, levers or linearly displaceable members, so as to spread these magnets apart and enable the workpieces to be inserted at the center of the ring surface.

According to yet another feature of the invention, the core cross section of the magnets tapers toward the ring-surface-forming ends. In this construction, the core cross section can be relatively large in the region of the coils and the pole faces can be relatively small so that the magnetic flux density which is effective along the arc welding path is increased.

It is also possible to taper the longitudinal edges of the cores toward the ends forming the ring surface, thereby further increasing the magnetic flux density and enabling the ring-forming ends to come into especially close proximity. Thus a chord of the arc of each core can be at most equal to the corresponding dimension within the coil. This arrangement also allows the width of the cores remote from these ends to be comparatively large and to carry larger coils.

The ring-forming ends can also be stepped.

According to the invention, moreover, the arc welding can be carried out under a protective gas atmosphere and, to this end, at least one of the cores is provided with a passage opening at the surface of this core forming the ring surface to supply the protective gas to the welding site.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
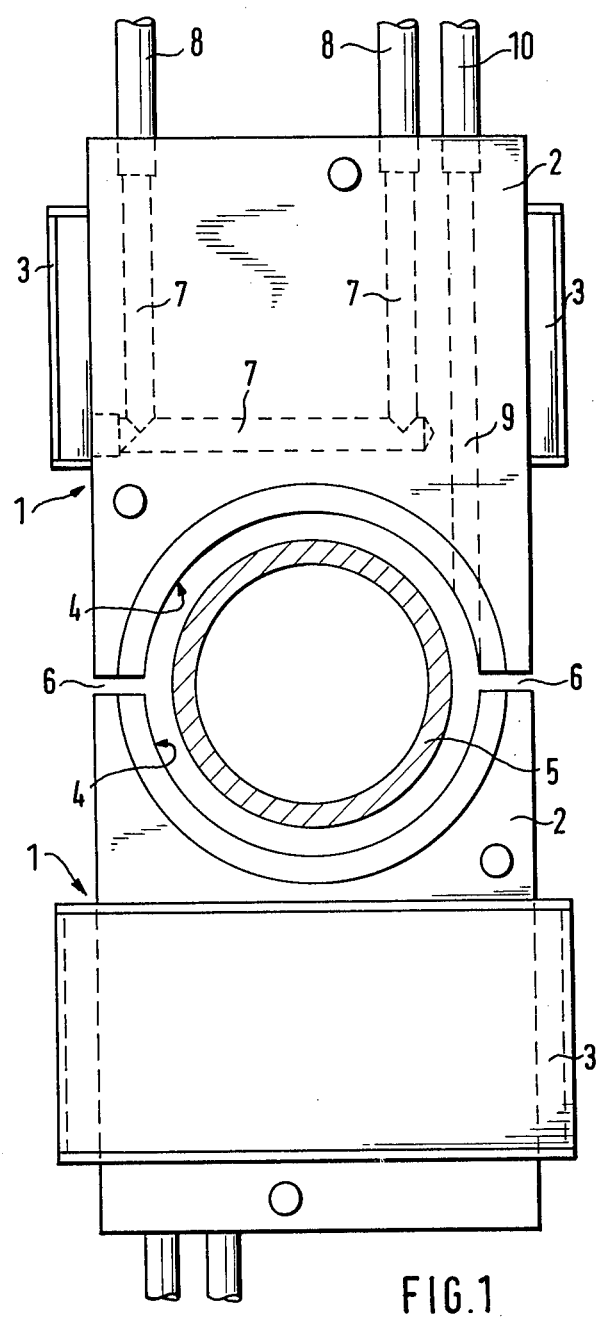
FIG. 1 is a plan view, partially in section, of an apparatus for welding two annular workpieces, i.e. two pipe ends, together according to the invention, the coil being shown in highly diagrammatic form.
Figure 2:
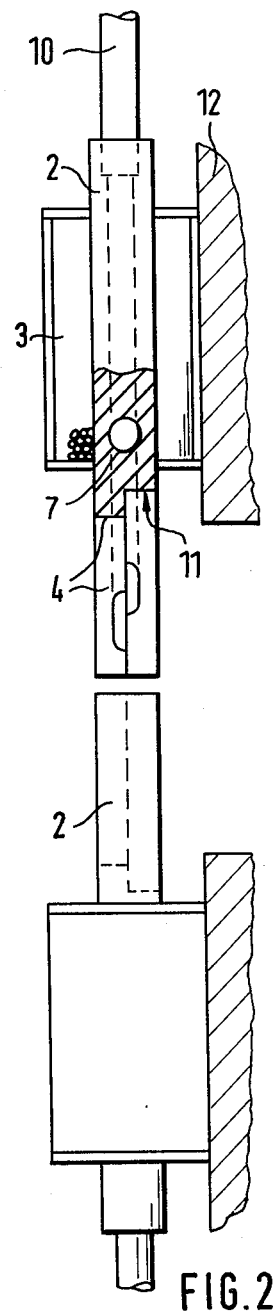
FIG. 2 is a side view, partly broken away, of the arrangement of FIG. 1.

The arrangement shown in FIGS. 1 and 2 comprises two magnets, each of which has an extremely flat core 2 of magnetic material, e.g. magnetically permeable ferromagnetic plate or a stack of electrical-steel strips, upon which an electric coil 3, also of flattened configuration, is disposed.

The juxtaposed semicylindrical ends of the magnets 1 have inner surfaces 4 which are brought practically together to define a magnetic ring surrounding the workpiece 5 to be welded in an annular weld seam. The workpiece 5 is shown to be a pipe end which is welded to another pipe end along a circular seam.

The gaps 6 at the outer edges of the juxtaposed ends of the magnets 1 are extremely small and practically insignificant, being greatly exaggerated in the illustration shown in FIG. 1, serving only to enable the two magnets to be separated in case of need.

The magnets 1 at least in the region of their cores 2 are formed with passages 7 shown in broken lines in the upper part of FIG. 1, of straight-line configuration and are connected to a cooling-water network represented at 8.

A pipe 10 is connected to a further linear passage or bore 9 running through the core of the upper magnet 1 in the illustration of FIG. 1, the passage 9 terminating at the inner surface of the ring formed by the ends 4 as shown in FIG. 2 to supply an inert gas or protective atmosphere to the welding site.

As is also apparent from FIG. 2, the pole-forming end 4 of each magnet is stepped in thickness, the step being represented at 11, with respect to the thickness of the core. This concentrates the magnetic flux density at the magnetic ring formed between the ends 4 of the two magnets. A holder 12 carries the magnetic device. The means for supplying electric current to the two pipe ends and for holding the two pipe ends in juxtaposed position to form the welding seam, have not been illustrated.

Figure 3:
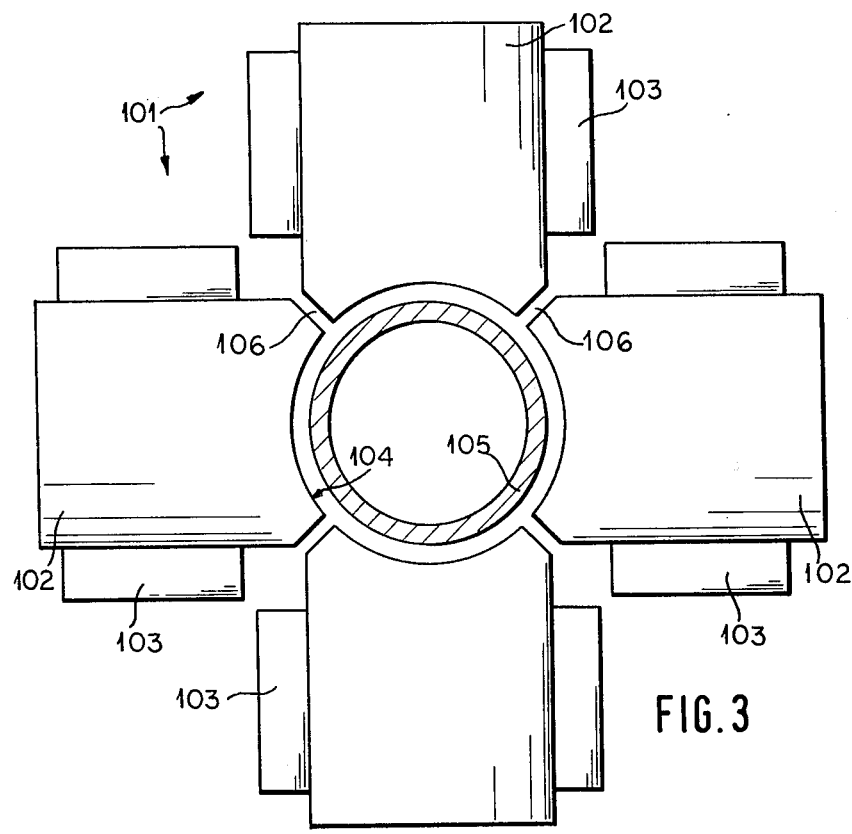
FIG. 3 is a diagrammatic plan view corresponding to FIG. 1 illustrating the use of four magnets.

FIG. 3 shows an arrangement in which four magnets 101 are provided at right angles to one another and radially. Each of these magnets is beveled along its longitudinal edges at 106 to converge toward the pole-forming arcuate end 104, thereby reducing the cross section of the magnet core and concentrating the magnetic flux density. Each of the arcuate ends 104 subtends an arc of 90° to form a practically closed ring, the gaps being insignificant around the workpiece 5. The magnets 101 have cores 102 surrounded by the flat coils 103 previously mentioned.

Figure 4:
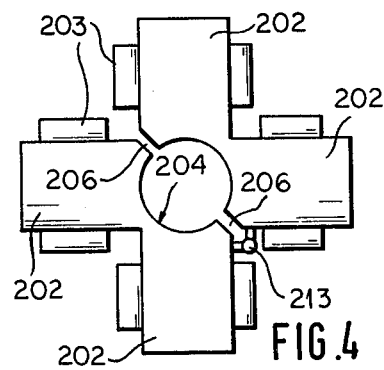
FIG. 4 is a view similar to FIG. 3 showing another two-magnet arrangement in which each magnet has two cores.

In the embodiment of FIG. 4, two unitary flat bodies of right-angled configuration form the cores 202 of a pair of magnets, each of the cores being surrounded by a respective coil 203, the two magnetic bodies being separated by insignificant gaps 206 and having juxtaposed semicylindrical formations 204 forming the magnetic ring. The two bodies can be hinged together at 213 about a pivot axis perpendicular to the plane of the paper in FIG. 4 to enable the bodies to be swung relatively as represented by the arrow for insertion of the workpiece.

Figure 5:
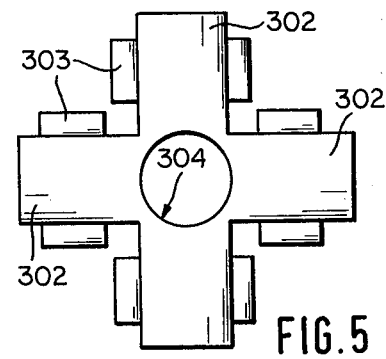
FIG. 5 is a similar view of a four-coil magnet arrangement utilizing a unitary core member.

FIG. 5 shows an embodiment in which a single magnetic core member is formed with radial arms constituting the cores 302 each of which carries a coil 303. The magnetic body has a bore 304 forming the ring.

Figure 6:
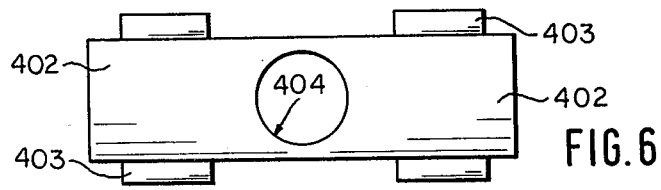
FIG. 6 is a diagram showing a simplified version of an apparatus similar to FIG. 1.

A simpler version of a one-piece magnetic body has been shown in FIG. 6 in which the two cores 402 are formed at opposite ends of a single flat magnetic plate provided with a central bore 404 forming the magnetic ring, each of the cores being surrounded by a flat magnet 403.

Naturally, a single body can also be provided with three radial cores, angularly equispaced at 120° from one another and carrying respective magnets, the body having a central bore as is shown in FIGS. 5 and 6. These and other arrangements within the spirit and scope of the appended claims are, of course, also deemed to be within the invention.

We claim:

1. An apparatus for the electric arc welding of two annular workpieces along an endless annular weld seam path lying in a plane, said apparatus comprising at least two radially extending flat unipolar magnet cores lying in said plane of said path and having juxtaposed ends directly forming a magnetizable ring in the plane of said path and surrounding same, each of said cores carrying a respective electromagnet coil, mutually juxtaposed ends of said cores being of circular arc segments forming said ring directly, the ends of said cores having faces juxtaposed with said seam end of an area no greater than respective cross sections of said cores surrounded by said coils said circular arc segments substantially completely enclosing said path in a substantially closed ring and having respective chord lengths of at most the width of the portions of the magnet cores surrounded by said coils in said plane.

2. The apparatus defined in claim 1 wherein two flat magnetic cores are produced and have their juxtaposed ends in the configuration of semicylinders.

3. The apparatus defined in claim 2 wherein at least one of said cores is formed with internal passages traversed by a coolant.

4. The apparatus defined in claim 3 wherein said passages are linear bores.

5. The apparatus defined in claim 1 wherein said cores are formed on a unitary magnetic body provided centrally with a bore traversed by the workpieces to be welded, said body having arms forming said core.

6. The apparatus defined in claim 1 wherein two bodies having semicylindrical surfaces are juxtaposed with one another, each of said bodies having a pair of arms at right angles to one another forming respective cores and provided with respective coils, further comprising means for pivotally connecting said bodies to enable at least one of said bodies to swing away from the other of said bodies.

7. The apparatus defined in claim 1 wherein said cores converge toward said ends to concentrate the respective flux densities at said ring.

8. The apparatus defined in claim 7 wherein said cores are of reduced thickness at said ends.

9. The apparatus defined in claim 7 wherein said cores have longitudinal edges beveled toward said ends.

10. The apparatus defined in claim 1, further comprising a passage formed in at least one of said cores and opening at an inner surface of the respective ring-forming end thereof for delivering a protective gas atmosphere to the weld site.

* * * * *

UNITED STATES PATENT AND TRADEMARK OFFICE
CERTIFICATE OF CORRECTION

PATENT NO. : 4,436,980

DATED : 13 March 1984

INVENTOR(S) : Norbert PACHE et al

It is certified that error appears in the above-identified patent and that said Letters Patent is hereby corrected as shown below:

On the title page:

In the heading, left column, item [73], please change the assignee's name to read:

-- KUKA Schweissanlagen + Roboter GmbH, Augsburg, Fed. Rep. of Germany --.

Signed and Sealed this

Seventh Day of August 1984

[SEAL]

Attest:

GERALD J. MOSSINGHOFF

Attesting Officer      Commissioner of Patents and Trademarks